United States Patent

Dassanayake

Patent Number: 5,428,509
Date of Patent: Jun. 27, 1995

[54] SPACE-EFFICIENT LIGHT COLLECTOR

[75] Inventor: Mahendra Dassanayake, Farmington Hills, Mich.

[73] Assignee: Ford Motor Company, Dearborn, Mich.

[21] Appl. No.: 205,453

[22] Filed: Mar. 4, 1994

[51] Int. Cl.[6] .............................................. F21V 7/08
[52] U.S. Cl. ...................................... 362/32; 362/304; 362/346; 362/348
[58] Field of Search .................. 362/32, 304, 305, 310, 362/346, 348, 350

[56]  References Cited

U.S. PATENT DOCUMENTS

| | | | |
|---|---|---|---|
| 3,720,822 | 3/1973 | Rochester et al. | 362/6 |
| 3,784,778 | 1/1974 | McPherson et al. | 219/60 A |
| 4,035,631 | 7/1977 | Day, Jr. | 362/297 |
| 4,056,090 | 11/1977 | Henriques et al. | 126/667 |
| 4,056,094 | 11/1977 | Rosenberg | 126/698 |
| 4,120,282 | 10/1978 | Espy | 126/684 |
| 4,151,005 | 4/1979 | Strebkov et al. | 136/256 |
| 4,203,672 | 5/1980 | Smith, Jr. | 356/431 |
| 4,218,727 | 8/1980 | Shemitz et al. | 362/350 |
| 4,233,493 | 11/1980 | Nath | 362/32 |
| 4,234,354 | 11/1980 | Lidorenko et al. | 136/246 |
| 4,249,514 | 2/1981 | Jones | 126/605 |
| 4,253,895 | 3/1981 | Chenault | 156/163 |
| 4,408,266 | 10/1983 | Sclippa | 362/310 |
| 4,417,300 | 11/1983 | Bodmer | 362/304 |
| 4,419,984 | 12/1983 | McIntire | 126/657 |
| 4,420,261 | 12/1983 | Barlow et al. | 356/375 |
| 4,897,771 | 1/1990 | Barker | 362/298 |
| 4,954,715 | 9/1990 | Zold | 250/461.1 |
| 5,117,243 | 5/1992 | Swanberg et al. | 346/108 |
| 5,121,988 | 6/1992 | Blesener et al. | 356/442 |
| 5,170,448 | 12/1992 | Ackley et al. | 385/31 |
| 5,196,957 | 3/1993 | Brueggemann | 359/206 |
| 5,224,111 | 6/1993 | Stilwell, Jr. et al. | 372/38 |
| 5,247,383 | 9/1993 | Bruggemann | 359/197 |
| 5,317,484 | 5/1994 | Davenport et al. | 362/32 |

Primary Examiner—Ira S. Lazarus
Assistant Examiner—Alan B. Cariaso
Attorney, Agent, or Firm—Kevin G. Mierzwa; Roger L. May

[57] ABSTRACT

A light collector which includes a light pipe having a face with a center and a diameter. The light pipe also has a predetermined acceptance angle. The light source is located a predetermined distance from the light pipe positioned on a line perpendicular to the center of the face of the light pipe. A concave surface defined by a plurality of ellipsoidal sections having a common first focus and a common second focus is used to reflect light from the light source to the light pipe. The ellipsoidal section have decreasing eccentricities with increasing object angle along the concave surface. The light source is located substantially at the first focus of the plurality of ellipsoidal sections and the center of the face of the light pipe is located substantially at the second focus. The surface has an eccentricity such that light rays emitted from the light source reflected by the surface to the light pipe do not exceed the acceptance angle of the light pipe.

13 Claims, 3 Drawing Sheets

SPACE-EFFICIENT LIGHT COLLECTOR

BACKGROUND OF THE INVENTION

The invention relates generally to a light collector and more specifically a light collector for coupling light from a light source into a light pipe.

Elliptical light collectors are generally known in the field of light collectors for reflecting light from a light source and directing it into a light pipe. If a light source is placed at one focal point of an ellipse the light becomes focused at the other focal point of the ellipse. One undesirable property of prior collector designs is that the depth of the collector can become relatively large.

One aim in light collector design, such as for an automotive light distribution system, is to reduce the system package size without reducing light generating and gathering efficiency. As stated above, one drawback of the prior art elliptical light collector is that it is relatively deep and consequently difficult to accommodate in a limited area such as in an instrument panel of an automotive vehicle.

It would therefore be desirable to reduce the depth of a light collector provided that light coupling efficiency can be maintained.

SUMMARY OF THE INVENTION

The present invention overcomes the disadvantages of the prior art by providing a reduced-depth concave reflecting surface defined by a plurality of ellipsoidal sections having a common first focus and a common second focus which is used to reflect light from the light source to a light pipe. The light pipe has a face with a center and a diameter. The light pipe also has a predetermined acceptance angle. The light source which is located a predetermined distance from the light pipe is positioned on a line perpendicular to the center of the face of the light pipe. The ellipsoidal sections have decreasing eccentricities with increasing distance from the light source.

The light source is located substantially at the first focus of the plurality of ellipsoidal sections and the center of the face of the light pipe is located substantially at the second focus. The surfaces have eccentricities such that light rays emitted from the light source reflected by the surface to the light pipe do not exceed the acceptance angle of the light pipe.

DETAILED DESCRIPTION OF THE PREFERRED EMBODIMENT

Figure 1:
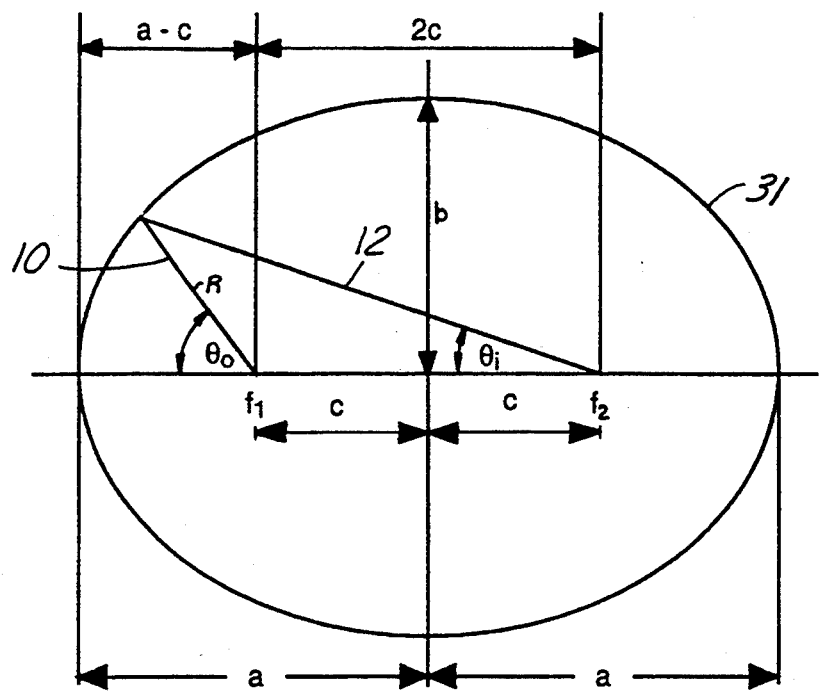
FIG. 1 shows a representation of an ellipse used in the present invention.

Referring now to FIG. 1, an ellipse 31 is shown having a major axis a, a minor axis b, a focal length c. The general formula for an ellipse is $$\frac{x^2}{a^2} + \frac{y^2}{b^2} = 1$$

where, $$a^2 - b^2 = c^2$$

The focal points are f1 and f2, The eccentricity e of an ellipse is defined as the ratio of the focal length c divided by the major axis length a, Focal point f1 represents a light source and ellipse 31 represents a mirrored surface. An object angle $\theta_O$ is defined as the angle between major axis a and light ray 10 originating from f1 which reflects off a reflection point 12 forming a reflected ray 11 on ellipse 31 with the origin of the angle as focus f1, The image angle $\theta_I$ is defined as the angle between major axis a and reflection point 12, Magnification m is defined as the ratio of distance from f1 to the image divided by the distance from f2 to the object, In other words if the object is located at f1 and the image is located at f2, then magnification is $$m = \frac{\left(\frac{a}{c}\right)^2 - 2\left(\frac{a}{c}\right)\cos\theta_o + 1}{\left(\frac{a}{c}\right)^2 - 1}$$

The distance to the mirror from the first focal point at any given at any $\theta_O$ is $$r = \frac{c\left(\left(\frac{a}{c}\right)^2 - 1\right)}{\frac{a}{c} + \cos\theta_o}$$

The object angle is related to the image angle by $$\tan\left(\frac{\theta_r}{2}\right) = \frac{\frac{a}{c} + 1}{\frac{a}{c} - 1} * \tan\left(\frac{\theta_o}{2}\right)$$

The above equations can be used to determine the formula of each ellipsoidal section when some initial information about the ellipse in the ellipsoidal section is known such as magnification and eccentricity.

FIG. 1 shows a two dimensional ellipse, however in practice the reflecting surface is a portion of a ellipse rotated about the major axis which forms an ellipsoidal surface.

Figure 2:
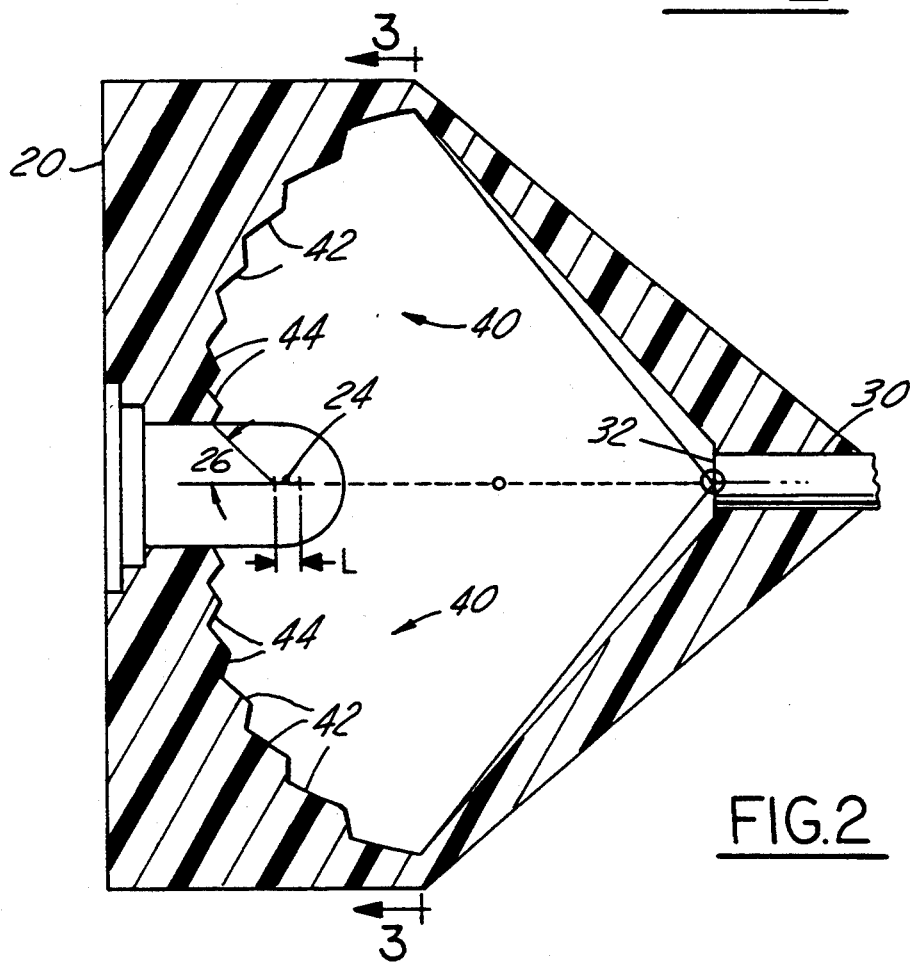
FIG. 2 is a longitudinal cross section of a light collector according to the present invention.
Figure 3:
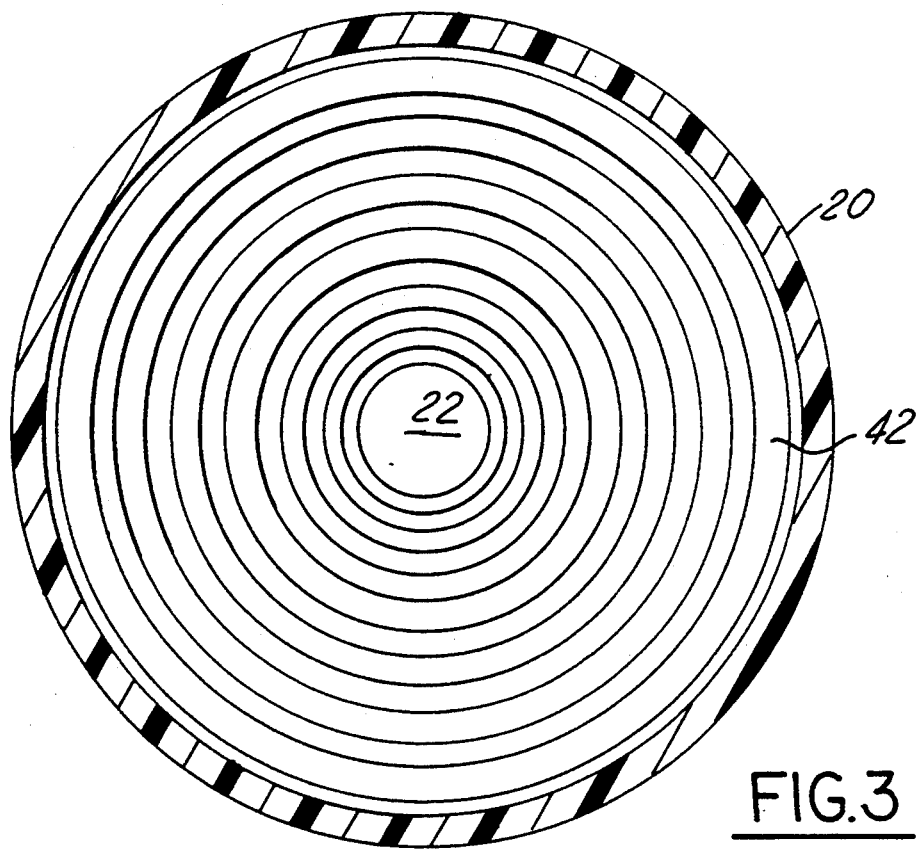
FIG. 3 is an axial cross section of the reflector of FIG. 1.

Referring now to FIGS. 2 and 3, a housing 20 is used to secure a light bulb 22 or other light source in a predetermined relationship with housing 20. A filament 24 emits light from a fixed location within light bulb 22. Filament 24 is preferably a linear element which is oriented axially in light bulb 10 (i.e., along the ellipse major axis as described below). Typically, little useful light is emitted from the longitudinal ends of filament 24. A useful angle 26 is the angle subtended by the non-useful light area from filament 24.

A light pipe 30 is also secured within housing 20. Light pipe 30 is a cylindrical optic element made of a common material such as plastic or glass. A typical light pipe is one made by the Lumenyte Corp. having a core index of refraction of 1.48. Light pipe 30 has a face 32 which is preferably oriented normal to the axis of light pipe 30 and normal to the axis of filament 24. Light pipe 30 has an acceptance angle which is the angle that light will be totally internally reflected in light pipe 30. Typically, the acceptance angle is in the range of 35° to 40° from the normal to the face of light pipe 30. Numerical aperture is a measure of light collection ability of light pipe 30 and is defined as the sine of the acceptance angle.

Housing 20 forms a generally concave chamber between light bulb 22 and light pipe 30 extending partially about light bulb 22. Housing 20 is preferably formed of a plastic such as a thermoset or thermoplastic. Collector surface 40 is generally comprised of a series of mirrored steps 42. The mirrored surface of each step can be an aluminum reflectorized surface which is commonly known in the art. Each step 42 is an ellipsoidal section having common focal points which will be further described with reference to FIG. 4 below. Each step 42 also has a side portion 44 which is shaped to not interfere with the light reaching steps 42.

The center of filament 24 and the center of the face of light pipe 30 form the focal points of the ellipsoidal steps 42 of collector surface 40. Each surface is formed so that the eccentricities of each ellipsoidal step 42 decrease as the object angle increase. Filament 24 has a predetermined length L which is typically 5 mm. When an image is reflected, magnification occurs as a function of the object angle of the ellipsoidal surface. In order to achieve a high efficiency when the image of the filament 24 is reflected from collector surface 40, filament 24 should not be magnified beyond the width of light pipe 30. For example, a typical light pipe 30 is approximately 10 mm in diameter. It then follows in this example that ellipsoidal step 42 should not have a magnification more than two.

Figure 4A:
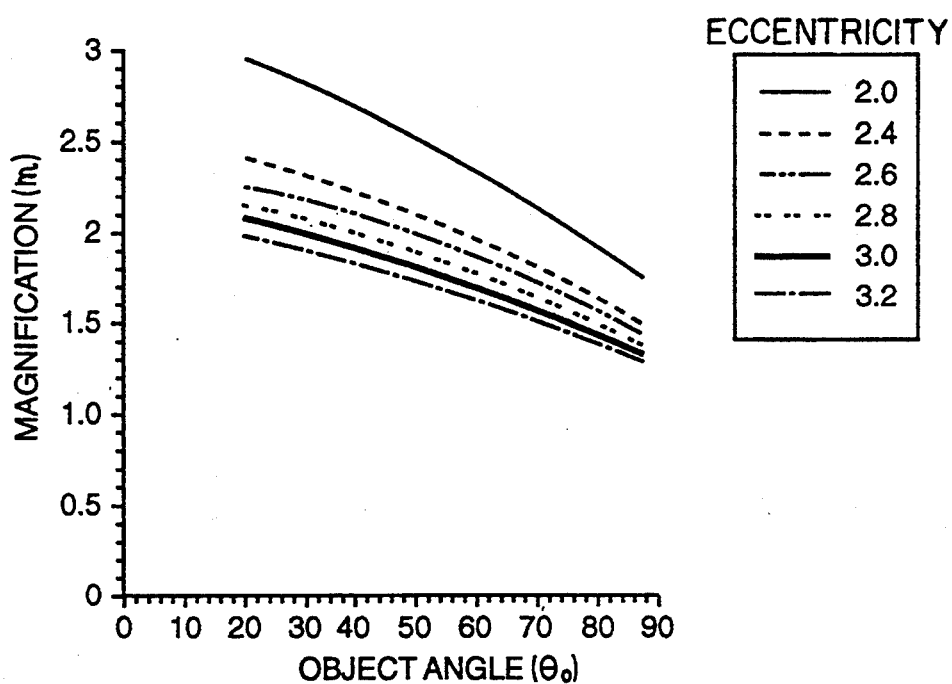
FIG. 4a is a graph of magnification versus object angle for a family of ellipses having different eccentricities.

Referring now to FIG. 4a, a family of curves is shown wherein each line corresponds to a respective eccentricity for a respective ellipse. Magnification is shown as a function of position along the ellipse (specified by $\theta_O$). A horizontal line at a magnification of two provides an upper limit for specifying eccentricity at various object angles. As an example, if the useful angle of the filament is 20° then the first step begins at an object angle of 20°. To obtain a magnification of two at an object angle of 20°, an eccentricity of 3.2 is specified by FIG. 4a. Thus, the first step closest to the light source uses a section of an ellipsoidal surface with an eccentricity 3.2. The first step is used through an object angle until a curve having the next lower eccentricity intercepts the line at magnification two. To keep the magnification as close to the desired magnification several steps are used. The larger the number of steps, the lower the variance of magnification is from the desired magnification. Thus, the magnification remains near the desired magnification. The next step away from the light source uses a section of an ellipsoidal surface with an eccentricity of 3.0 between object angles of about 30° to about 45°.

Figure 4B:
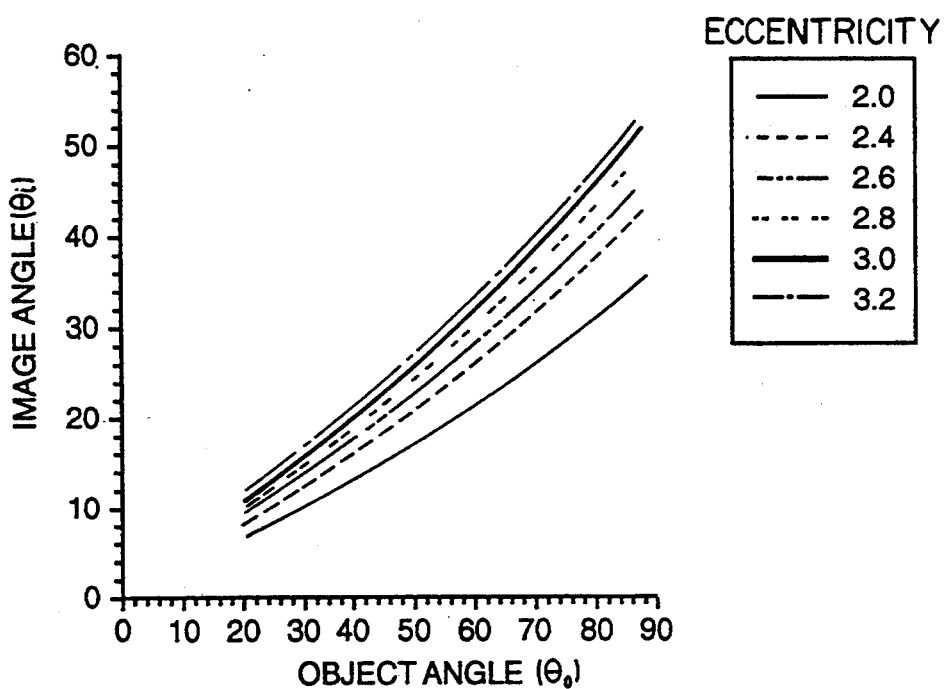
FIG. 4b is a graph of image angle versus object angle for a family of ellipses.

Referring now to FIG. 4b, once the object angle is known the corresponding image angle is determined. The image angle range should not exceed the acceptance angle of light pipe 30. The furthest step of surface 40 from light bulb 22 is at a point where the image angle which does not exceed the acceptance angle of the light pipe, which is typically 35° to 40°.

The above example assumes a magnification of two; however, if a different magnification was desired the same method can be used with a higher or lower magnification. Further, the change in eccentricity between adjacent steps can be more than or less than 0.2. In fact, the change between the steps need not be the same for all steps. Generally, the larger the number of steps (i.e., the smaller the change in eccentricity between steps) results in the greatest decrease in the depth of the reflector.

Figure 5:
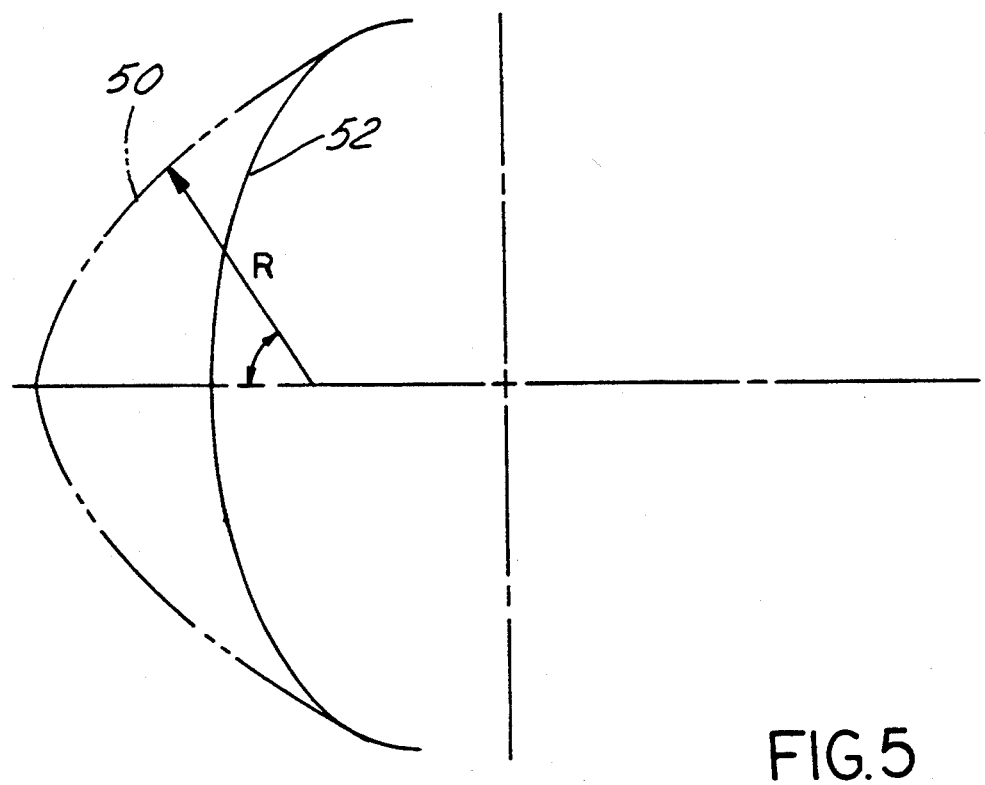
FIG. 5 shows the cross sectional surface in an alternative embodiment of the light collector of FIG. 2.

Referring now to FIG. 5, in continuing with the above example, the number of steps can be increased to infinity so that a continuously varying surface is formed. A representation is shown between a conventional ellipse 50 having a single eccentricity and a curved surface 52 formed by having a continuously increasing eccentricity. The eccentricity of any point on the curve decreases as the object angle increases.

What is claimed is:

1. A light collector comprising:
   a light pipe having a central axis and a planar face at one end thereof, said central axis intersecting said planar face at a center point said light pipe having a predetermined acceptance angle;
   a light source located a predetermined distance from said planar face and collinear with said central axis; and
   a concave reflective surface having a plurality of steps, each step having an ellipsoidal section with a common first focus substantially at the location of said light source and a common second focus substantially at the location of said center point, said ellipsoidal sections having generally decreasing eccentricities with increasing object angles, each ellipsoidal section having a magnification so that when said light source reflected from said reflective surface, an image of said light source is not greater than said planar face and each ellipsoidal section reflecting light into said light pipe at an angle not exceeding the acceptance angle of said light pipe.

2. A light collector as recited in claim 1 wherein said plurality of ellipsoidal sections form a continuous surface.

3. A light collector as recited in claim 1 wherein said steps are defined so that said magnification on any on step is less than about two.

4. A light collector as recited in claim 1 wherein said light source comprises a substantially linear filament, said planar face of said light pipe positioned substantially normal to said filament.

5. A light collector as recited in claim 4 wherein said filament has a useful angle of light emitted from the filament, said concave surface begins at a point whose angle in relation to said filament is an angle greater or equal to that subtended by said useful angle.

6. A light collector comprising:
   a light pipe having a planar face with a center;
   a light source located a predetermined distance from said light pipe positioned on a line substantially perpendicular to said face extending from said center of said light pipe;

a housing having an interior and exterior portion having a first aperture and a second aperture, said first aperture fixedly receiving said light source and said second aperture receiving said light pipe;

said interior portion having a concave surface defined by a plurality of steps, each step having an ellipsoidal section having a common first focus and a common second focus, said ellipsoidal sections having generally decreasing eccentricities with increasing object angle; and said light source located substantially at said first focus of said ellipse and said center of said face of said light pipe located substantially at said second focus;

whereby said ellipsoidal sections have an eccentricity such that light rays emitted from said light source reflected from said ellipsoidal sections do not exceed the acceptance angle of said light pipe and, each ellipsoidal section having a magnification so that when said light source reflected from said reflective surface, an image of said light source is not greater than said planar face, and each ellipsoidal section reflecting light into said light pipe at an angle not exceeding the acceptance angle of said light pipe.

7. A light collector as recited in claim 6 wherein said predetermined relationship is such that said light source is disposed along a line perpendicular to said center of said light pipe.

8. A light collector as recited in claim 6 wherein said steps are defined so that said magnification on any on step is less than about two.

9. A light collector as recited in claim 6 said light pipe face is a planar surface.

10. A light collector as recited in claim 9 wherein said light source comprises a substantially linear filament, said planar face of said light pipe positioned substantially normal to said filament.

11. A light collector as recited in claim 10 wherein said filament has a useful angle of light emitted from the filament, said concave surface begins at a point whose angle in relation to said filament is an angle greater or equal to that subtended by said useful angle.

12. A light collector comprising:

a light pipe having a planar face with a center and a diameter, said light pipe having a predetermined acceptance angle;

a light source located a predetermined distance from said light pipe positioned on a line substantially perpendicular to said face extending from said center thereof of said light pipe; and a discontinuous concave reflecting surface having a plurality of steps, each step formed of two portions, a side portion and reflecting portion, said reflecting portions defined by a plurality of ellipsoidal sections having a common first focus substantially at the location of said light source and a common second focus substantially at the location of said center of said face of said light pipe, said reflecting portions having generally decreasing eccentricities with increasing object angles, said side portions shaped not to interfere with light reaching said reflecting portion.

13. A light collector as recited in claim 12 wherein each reflecting portion has a magnification less than a common predetermined magnification, and each reflecting portion reflecting light into said light pipe at an angle not exceeding the acceptance angle of said light pipe.

* * * * *